US011049234B2

United States Patent
Maurin et al.

(10) Patent No.: US 11,049,234 B2
(45) Date of Patent: Jun. 29, 2021

(54) BAGGAGE IDENTIFICATION METHOD

(71) Applicant: IDEMIA IDENTITY & SECURITY FRANCE, Courbevoie (FR)

(72) Inventors: Franck Maurin, Courbevoie (FR); Anthony Barre, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/809,151

(22) Filed: Mar. 4, 2020

(65) Prior Publication Data
US 2020/0302589 A1    Sep. 24, 2020

(30) Foreign Application Priority Data

Mar. 22, 2019    (FR) ...................................... 1902969

(51) Int. Cl.
*G06T 7/00*     (2017.01)
*G06N 20/10*    (2019.01)
(Continued)

(52) U.S. Cl.
CPC ............ *G06T 7/0002* (2013.01); *G06K 9/628* (2013.01); *G06K 9/6277* (2013.01); *G06N 3/08* (2013.01);
(Continued)

(58) Field of Classification Search
CPC ......... G06T 7/0002; G06T 7/97; G06T 7/001; G06T 2207/10048; G06T 2207/20081;
(Continued)

(56) References Cited

U.S. PATENT DOCUMENTS 6,158,658 A  * 12/2000 Barclay .................. B64F 1/366
                                                           235/375
10,019,654 B1 *  7/2018 Pisoni ..................... G06N 3/084
(Continued)

FOREIGN PATENT DOCUMENTS

EP          3312785 A1    4/2018
WO      2014/060227 A1    4/2014

OTHER PUBLICATIONS

Nov. 8, 2019 Search Report issued in French Patent Application No. 1902969.

*Primary Examiner* — Michael S Osinski
(74) *Attorney, Agent, or Firm* — Oliff PLC; R. Brian Drozd

(57) ABSTRACT

A method identifies a non-identified baggage item based on: acquisition of at least two images of the non-identified baggage of different types, the type of one image of a baggage item dependant on a point-of-view on the baggage in the image and/or on the nature of the data representing the baggage in the image taken among different natures of data comprising data representing the visible range and/or infrared data and/or data representing three-dimensional information; and, for each image type, on use of a neural network suited to the type for classifying the baggage represented by the image in a class of baggage classes defined for the type. Once obtained, the classes allow seeking of baggage corresponding to each class identified in a baggage database. Each baggage item in the database is associated with the baggage addressee. Each corresponding baggage item is compared with the non-identified baggage to identify the addressee.

6 Claims, 6 Drawing Sheets

(51) Int. Cl.
*G06K 9/62* (2006.01)
*G06N 3/08* (2006.01)

(52) U.S. Cl.
CPC .............. *G06N 20/10* (2019.01); *G06T 7/97* (2017.01); *G06T 2207/10048* (2013.01); *G06T 2207/20081* (2013.01); *G06T 2207/20084* (2013.01)

(58) Field of Classification Search
CPC . G06T 2207/20084; G06T 2207/10028; G06T 2207/30112; G06N 20/10; G06N 3/08; G06N 3/0454; G06N 3/084; G06N 3/0445; G06N 3/0472; G06K 9/6277; G06K 9/628; G06K 9/6267; G06K 9/00201; G06K 9/6287; G06K 9/00771; G06K 9/4628; G06K 9/6256; G06K 9/3241; G06K 9/6262; G06K 9/3233; G06K 9/4652; G06K 2209/19; G06Q 10/08; G07C 2011/02; G07C 2209/41
See application file for complete search history.

(56) References Cited

U.S. PATENT DOCUMENTS

| | | | | |
|---|---|---|---|---|
| 10,157,317 B2* | 12/2018 | Chen | ............... | G01V 5/0041 |
| 10,275,734 B2* | 4/2019 | Tang | ............... | G01V 5/0033 |
| 10,460,209 B2* | 10/2019 | Li | ............... | G06K 9/6292 |
| 10,474,897 B2* | 11/2019 | Xu | ............... | G06K 9/00671 |
| 10,579,897 B2* | 3/2020 | Redmon | ............... | G06K 9/4619 |
| 10,977,523 B2* | 4/2021 | Li | ............... | G06K 9/6267 |
| 2005/0128304 A1* | 6/2005 | Manasseh | ............... | G07C 9/00 348/207.99 |
| 2007/0286338 A1* | 12/2007 | Sykes | ............... | G01V 5/0083 378/57 |
| 2009/0316988 A1* | 12/2009 | Xu | ............... | G06K 9/6857 382/173 |
| 2010/0096444 A1* | 4/2010 | Cummings | ............... | G06Q 10/08 235/375 |
| 2011/0267192 A1* | 11/2011 | Goldman | ............... | G06Q 10/107 340/568.1 |
| 2012/0089639 A1* | 4/2012 | Wang | ............... | G06Q 10/10 707/770 |
| 2014/0307974 A1* | 10/2014 | Tanaka | ............... | G06K 9/72 382/218 |
| 2015/0029026 A1* | 1/2015 | Brandes | ............... | A45C 13/18 340/571 |
| 2016/0075449 A1* | 3/2016 | Ziegler | ............... | G06K 19/07713 700/227 |
| 2016/0117631 A1* | 4/2016 | McCloskey | ............... | G06Q 10/083 705/337 |
| 2016/0275375 A1* | 9/2016 | Kant | ............... | G06K 9/6218 |
| 2016/0379371 A1* | 12/2016 | Chen | ............... | G06T 7/168 382/173 |
| 2017/0004384 A1* | 1/2017 | Audo | ............... | G06K 9/00 |
| 2017/0004444 A1* | 1/2017 | Krasko | ............... | G06Q 10/0833 |
| 2017/0083752 A1* | 3/2017 | Saberian | ............... | G06N 3/0454 |
| 2017/0091501 A1* | 3/2017 | Ito | ............... | G06F 16/7867 |
| 2017/0169313 A1* | 6/2017 | Choi | ............... | G06K 9/4628 |
| 2017/0206431 A1* | 7/2017 | Sun | ............... | G06F 16/5838 |
| 2018/0111699 A1* | 4/2018 | Imseeh | ............... | G06F 16/51 |
| 2018/0129919 A1* | 5/2018 | Tang | ............... | G06K 9/4628 |
| 2018/0189611 A1 | 7/2018 | Dal Mutto et al. | | |
| 2019/0095716 A1* | 3/2019 | Shrestha | ............... | G08B 21/187 |
| 2019/0279045 A1* | 9/2019 | Li | ............... | G06K 9/6228 |
| 2019/0286930 A1* | 9/2019 | Han | ............... | G06K 9/3241 |
| 2019/0392318 A1* | 12/2019 | Ghafoor | ............... | G06K 9/6256 |
| 2020/0027002 A1* | 1/2020 | Hickson | ............... | G06K 9/6218 |
| 2020/0097724 A1* | 3/2020 | Chakravarty | ............... | G06K 9/6289 |
| 2020/0143561 A1* | 5/2020 | Hallett | ............... | G06T 7/292 |
| 2020/0210774 A1* | 7/2020 | Jakubowicz | ............... | G06N 3/063 |
| 2020/0302230 A1* | 9/2020 | Chang | ............... | G06K 9/00979 |
| 2020/0349498 A1* | 11/2020 | Brooks | ............... | G06K 9/6274 |
| 2020/0410281 A1* | 12/2020 | Goel | ............... | G06K 9/00228 |
| 2021/0053699 A1* | 2/2021 | Carpenter | ............... | B64F 1/368 |

\* cited by examiner

BAGGAGE IDENTIFICATION METHOD

TECHNICAL FIELD

The invention relates to a method for identifying baggage devoid of any identifier representing an addressee of said baggage, referred to as non-identified baggage, and a device and system using said method.

PRIOR ART

Each year, each airline must transport a large amount of baggage. There are in fact approximately four billion baggage items transported per annum by all airlines. Although in theory each item of baggage is systematically labelled before being transported, a certain number of these baggage items are lost. These losses are often due to the label thereof being torn off. Once devoid of its label, that is to say without any identifier for identifying the addressee of said baggage, the baggage becomes non-identified baggage for which it is very difficult to find the addressee. The addressee of a baggage item is either its owner or a person or entity for whom this baggage is intended. Even though the proportion of baggage items without a label (0.07%) may appear small, searching for their addressee is a lengthy and expensive operation having a not insignificant financial impact for airlines, without any certainty of result: up until now, the lost baggage for which no addressee has been able to be identified is destroyed, which, from the point of view of the addressees, is highly unsatisfactory.

DISCLOSURE OF THE INVENTION

It is desirable to overcome these drawbacks of the prior art. It is in particular desirable to propose a method making it possible in particular to identify an addressee of a non-identified baggage item.

According to a first aspect of the invention, the invention relates to a method for identifying a baggage item devoid of any identifier representing an addressee of said baggage, referred to as non-identified baggage. The method comprises: obtaining at least two images of the non-identified baggage of different types, the type of image of a baggage item being dependent on a point of view on said baggage represented by said image and/or the nature of the data representing said baggage in said image taken from a plurality of natures of different data comprising data representing the visible range and/or data representing the infrared range and/or data representing three-dimensional information; for each image of the non-identified baggage obtained: applying to said image a convolutional neural network trained on baggage images of the same type as said image in order to obtain, for each class in a plurality of baggage classes defined for the type of image, a probability of said non-identified baggage belonging to said class; and identifying the baggage classes having the highest probability; applying a baggage search procedure comprising: searching for baggage corresponding to each class identified in a baggage database in order to obtain at least one candidate baggage item, each baggage item in said database being associated with an identifier representing an addressee of the baggage; comparing the non-identified baggage with each candidate baggage item in order to identify the addressee of said non-identified baggage.

The invention therefore makes it possible to obtain a small set of candidate baggage items, which facilitates the identification of the addressee of the non-identified baggage.

According to one embodiment, the method comprises obtaining at least one item of information representing the non-identified baggage among a weight, a colour and at least one dimension, the baggage search procedure further comprising seeking in the database baggage corresponding to each item of information representing said non-identified baggage.

According to one embodiment, each baggage item referenced in the database is associated with timestamp information representing a time of checking in of said baggage, the baggage search procedure further comprising seeking in the database baggage associated with timestamp information corresponding to a period determined from a time of discovery of the non-identified baggage.

According to one embodiment, each baggage item referenced in the database is associated with a number of items of classification information equal to a number of types of image considered at the time of each classification of a baggage item in the database, each type of image used for the non-identified baggage corresponding to at least one type of image considered at the time of each classification of a baggage item in the database, each item of classification information corresponding to a type of image and representing a class in a plurality of classes associated with said type in which the baggage was classified.

According to a second aspect of the invention, the invention relates to a device for identifying a baggage item devoid of any identifier representing an addressee of said baggage, referred to as non-identified baggage; the device comprises: obtaining means for obtaining at least two images of the non-identified baggage, of different types, the type of image of a baggage item being dependent on a point of view on said baggage represented by said image and/or the nature of the data representing said baggage in said image taken from a plurality of natures of different data comprising data representing the visible range and/or data representing the infrared range and/or data representing three-dimensional information; classification means applied to each image of the non-identified baggage obtained comprising: processing means for applying to said image a convolutional neural network trained on images of baggage of the same type as said image in order to obtain, for each class in a plurality of classes of baggage defined for the type of image, a probability of said non-identified baggage belonging to said class; and identification means for identifying the class of baggage having the highest probability; processing means for applying a baggage search procedure comprising: search means for searching for baggage corresponding to each class identified in a baggage database in order to obtain at least one candidate item of baggage, each item of baggage in said database being associated with an identifier representing an addressee of the baggage; and comparison means for comparing the non-identified baggage with each candidate item of baggage in order to identify the addressee of the non-identified baggage.

According to a third aspect of the invention, the invention relates to a computer program comprising instructions for the implementation, by a device, of the method according to the first aspect, when said program is executed by a processor of said device.

According to a fourth aspect of the invention, the invention relates to storage means storing a computer program comprising instructions for the implementation, by a device, of the method according to the first aspect, when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

The invention is described hereinafter in a context of air transport and focuses on the transport of baggage. The invention is however suited to other contexts where a transporter takes responsibility for baggage. For example, the invention is suited to transport by boat or by bus when the baggage is labelled prior to the transport and then taken over by the transporter. The invention also applies to any object transported by a transporter that is labelled prior to the transport, the object being taken over by the transporter.

Figure 1:
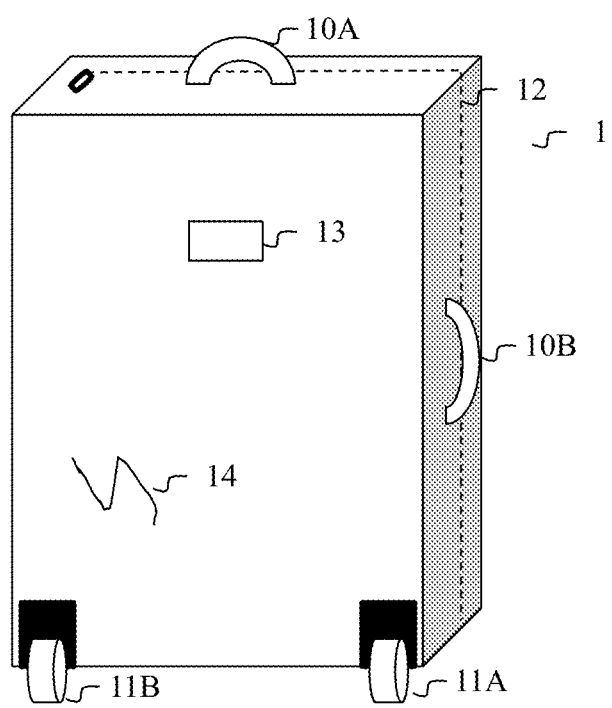
FIG. 1 illustrates schematically an example of a baggage item.

FIG. 1 illustrates schematically an example of a baggage item 1.

The baggage 1 depicted in FIG. 1 has a set of characteristics. The baggage 1 comprises six substantially rectangular faces, two faces of which comprise a handle (10A, 10B). The baggage 1 also comprises two wheels 11A and 11B, a closure system 12 such as a zip closure, and a mark 13 such as a distinctive sign of the manufacturer of the baggage. The faces of the baggage here have a uniform colour and are made from materials having a certain texture. The baggage is damaged since it has in particular a visible scratch 14. All these characteristics of the baggage 1 form a signature of said baggage 1.

One possible solution that might make it possible to identify an addressee of a non-identified baggage item would, at the time of the labelling of each baggage item, be to store all the characteristics of said baggage in a database. Thus, when a baggage item was to be identified, it would be possible to take all the characteristics of said baggage and to compare them with the characteristics of the baggage items stored in the database in order to find the corresponding baggage item.

A first limitation of this solution is related to the small amount of time left to an operator responsible for the labelling of each baggage item in order to store all the characteristics of each baggage item. An operator does not in fact have the time to note these characteristics. It would therefore be preferable for the recovery of all the characteristics of a baggage item to be automatic.

A second limitation is related to the small amount of diversity of appearance in baggage. It is known that a majority of baggage items are very similar. A majority of baggage items are rectangular, have two or four wheels, one or two handles, and a closure system of the zip type, and have a dark colour. Even if it would be physically possible to allow an operator to note all the characteristics of a baggage item, the question of the characteristics to be noted is posed. This because it is essential to note the characteristics making it possible to distinguish the baggage items from each other.

A third limitation results from this lack of diversity of appearance of baggage. Two very similar baggage items are generally distinguished on details. An operator is not necessarily capable of distinguishing such details in particular because the conditions under which it observes the baggage are not suitable.

Figure 2:
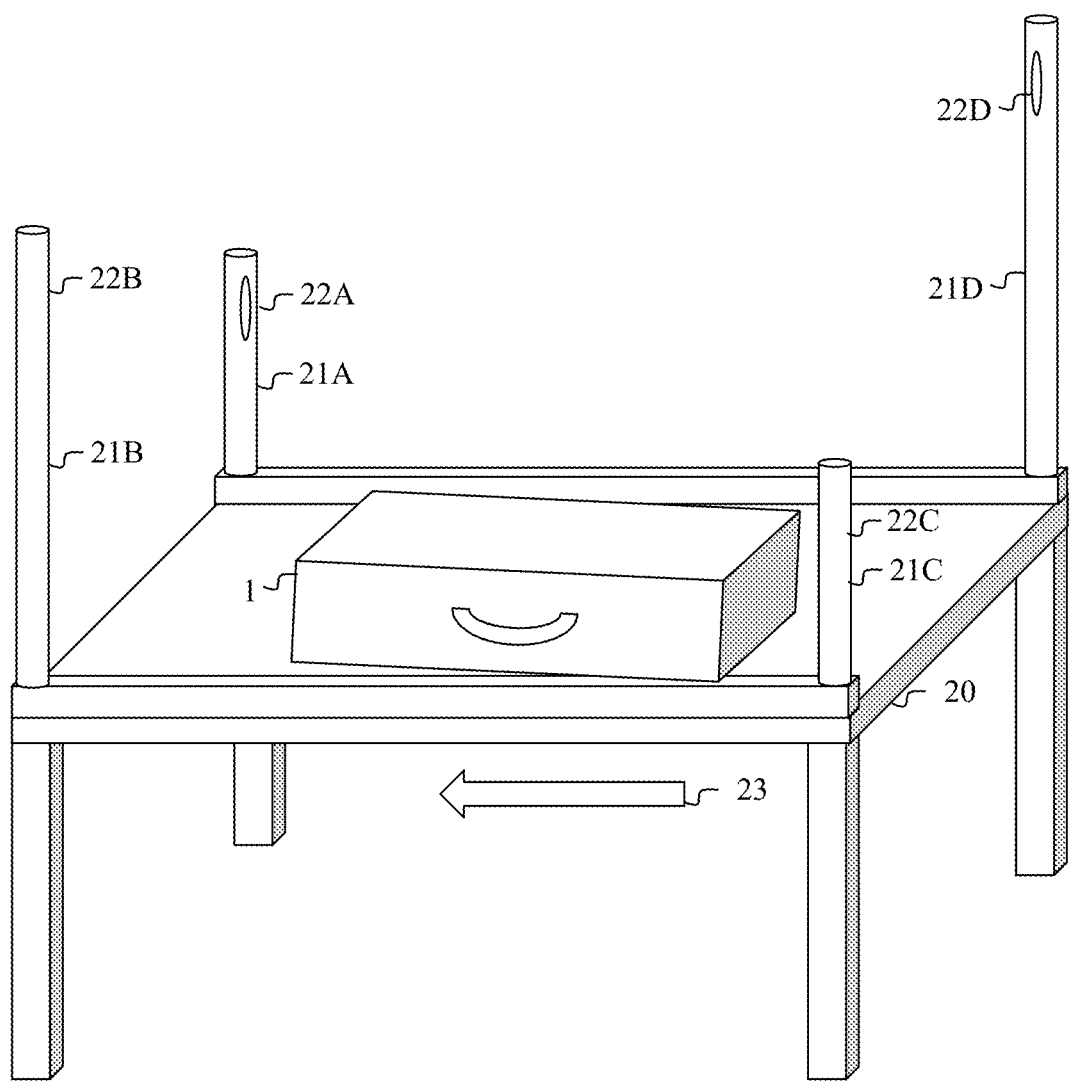
FIG. 2 illustrates schematically an example of a system for acquiring images of a baggage item.

FIG. 2 illustrates schematically an example of a system for acquiring images of a baggage item.

FIG. 2 depicts schematically a baggage check-in desk 2 in an airport. A user places his baggage (for example the baggage item 1) on a conveyor belt included in the check-in desk 20 comprising means for measuring the weight of said baggage. Once checking formalities have been carried out by an operator responsible for the check-in desk 20 (check on identity, issue of a boarding card, etc.) the operator fixes a label to said baggage. This label comprises an identifier representing an addressee of said baggage. Here the addressee of the baggage is the user who has deposited the baggage, who will receive his baggage when he arrives at his destination airport.

Figure 3:
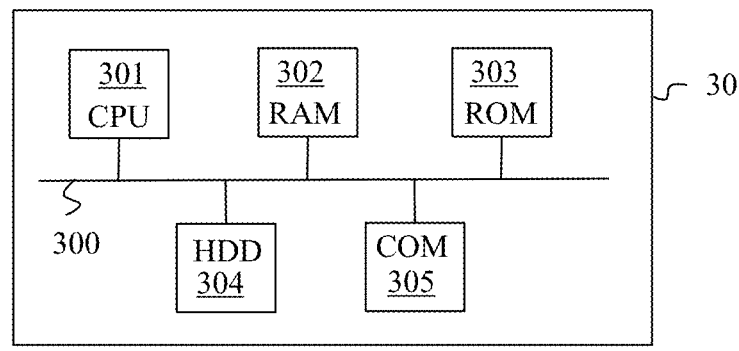
FIG. 3 illustrates an example of hardware architecture of the device implementing the invention.

In the example in FIG. 2, the baggage check-in desk 20 comprises a system for acquiring images of a baggage item comprising four camera supports 21A, 21B, 21C and 21D and a processing module 30, not depicted in FIG. 2 but detailed in FIG. 3. The camera supports 21A, 21B, 21C and 21D are rods of variable heights. The camera support 23A (and respectively 21B, 21C and 21D) comprises at least one camera 22A (respectively 22B, 22C and 22D), the cameras 21B and 21C do not appear in FIG. 2. Each camera is focused on a zone where a baggage item should be situated following the depositing of said baggage at the check-in desk 20. If the baggage is not positioned so as to be at least partly visible to each camera, the operator can for example activate the conveyor belt of the check-in desk 20 in order to position the baggage correctly.

As soon as the baggage is positioned correctly with respect to each camera, the processing module 30 activates each camera in order to acquire an image of the baggage by camera. In the example in FIG. 2, the cameras 22B and 22D (and respectively 22A and 22C) are positioned at the same height, but have almost opposing points of view on the baggage. The cameras 22B and 22D on the one hand and 22A and 22C on the other hand are positioned at different heights. Each image acquired therefore represents a different point of view on said baggage. It is therefore said that the images acquired by the cameras 21A, 21B, 21C and 21D are of different types. The type of an image of a baggage item therefore in this case depends on a point of view on said baggage represented by said image.

In one embodiment, each camera makes acquisitions of images in a visible range. A camera making acquisitions in the visible range is hereinafter referred to as a visible camera.

In one embodiment, each camera makes acquisitions of images in an infrared range (referred to as IR images). A camera making acquisitions in an infrared range is hereinafter referred to as an IR camera. Acquiring images in the infrared range makes it possible to overcome illumination defects or artefacts appearing in the visible range as reflections on said baggage.

In one embodiment, at least one camera is able to provide a depth map such as an INTEL® REALSENSE™ DEPTH CAMERA D435 described in the document Product brief INTEL® REALSENSE™ DEPTH CAMERA D435 or an RGBD (red green blue depth) camera. A camera able to provide a depth map, referred to as a 3D camera hereinafter, is capable of providing three-dimensional information (i.e. a 3D image) on a scene observed by said 3D camera. A 3D camera makes it possible in particular to determine dimensions of a baggage such as its length, width and thickness.

In one embodiment, the cameras 21A, 21B, 21C and 21D combine at least one visible camera, at least one IR camera and at least one 3D camera.

When the cameras 21A, 21B, 21C and 21D comprise at least two cameras providing images of different natures (image in the visible range and IR image, or image in the visible range and depth map image, or depth map image and IR image, etc.), the type of image of a baggage item depends in this case on a point of view on said baggage represented by said image and the nature of said image.

In one embodiment, the system for acquiring images of a baggage item comprise at least one camera support, each camera support comprising at least one camera. Said system provides at least two images of the same baggage item of different types. When the system for acquiring images of a baggage item comprises a single camera, two images of different types are obtained, for example by activating the conveyor belt of the baggage check-in desk 20 with respect to the camera so as to move the baggage slightly. The conveyor belt is for example activated by the processing module 30.

In one embodiment, we suppose that each baggage check-in desk used by an airline comprises a system for acquiring images of a baggage item as described in relation to FIG. 2. Each image acquired by one of these systems is stored in a database. In this database, each image is associated with information representing the addressee of the baggage, timestamp information representing the time of checking in of said baggage and information on classification of the baggage contained in the image. In one embodiment, the processing module 30 communicates with a device that generated the label affixed to the baggage and the information representing the addressee of the baggage stored in the database is represented by a digital copy of the label. As we describe hereinafter, the baggage represented by each baggage image is classified in a class of baggage in a set of baggage classes. Each type of image is associated with a set of baggage classes dependent on said type. We describe hereinafter in relation to FIGS. 6A, 6B and 6C how the baggage classes are formed and in relation to FIG. 7 how each baggage item is classified. Each baggage image (and therefore each baggage item) checked in by the airline company is therefore referenced in the database.

The database is for example stored on a remote server of an airline with which the processing module 30 of each system for acquiring images of a baggage item is connected by a communication network. Each system for acquiring images of a baggage item when said baggage item is checked in is hereinafter referred to as the check-in system.

FIG. 3 illustrates schematically an example of hardware architecture of the processing module 30.

According to the example of hardware architecture depicted in FIG. 3, the processing module 30 then comprises, connected by a communication bus 300: a processor or CPU (central processing unit) 301; a random access memory RAM 302; a read only memory ROM 303; a storage unit such as a hard disk or a storage medium reader, such as an SD (Secure Digital) card reader 304; at least one communication interface 305 enabling for example the processing module 30 to receive images from the cameras 21A, 21B, 21C and 21D, and to communicate with a remote server storing the database.

The processor 301 is capable of executing instructions loaded in the RAM 302 from the ROM 303, from an external memory (not shown), from a storage medium (such as an SD card) or from a communication network. When the processing module 30 is powered up, the processor 301 is capable of reading instructions from the RAM 302 and executing them. These instructions form a computer program causing the execution, by the processor 301, of the method described below in relation to FIG. 4.

Figure 4:
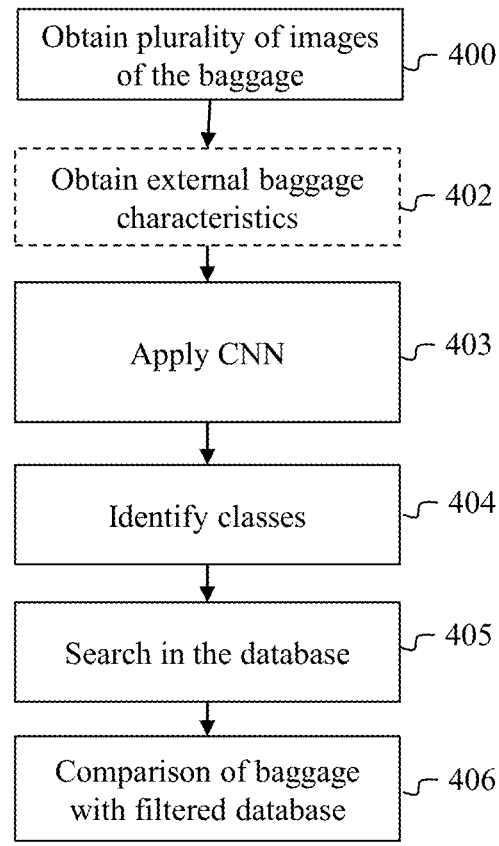
FIG. 4 illustrates schematically a method for identifying an addressee of a non-identified baggage item.

The method described in relation to FIG. 4 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 4 illustrates schematically a method for identifying an addressee of a non-identified baggage item.

The method in FIG. 4 is executed when a non-identified baggage item is discovered (for example without a label) in an airport. An operator acquires images of said baggage item in order to compare it with baggage items in the database. In one embodiment, the operator uses for this purpose a system for acquiring images of a baggage item identical to the system described in relation to FIG. 2. A system for acquiring images of a non-identified baggage item is hereinafter referred to as a search system. On the other hand, the conditions of acquisition of the images of the non-identified baggage by the search system (i.e. position of the baggage in the system, illumination conditions) are not necessarily identical to the conditions of acquisition of the images of the same baggage by the check-in system. We shall see hereinafter that the method for identifying an addressee of a non-identified baggage item relies on a convolutional neural network, which makes it possible not to have to calibrate the acquisition conditions so that they are identical on the check-in system and on the search system.

In a step 400, the processing module 30 of the search system obtains a plurality of images of the non-identified baggage of different types. To do this the processing module 30 of the search system causes an acquisition of images of the non-identified baggage. In this embodiment, the departure and arrival systems being identical, the processing module 30 of the search system obtains an image of the baggage for each image type acquired by the check-in system. The search system then obtains a number $N_{Type}$ of images, the number $N_{Type}$ being the number of different image types that the processing module 30 of the search system must consider.

In a step 403, for each image of the non-identified baggage obtained, the processing module 30 of the search system applies to said image a convolutional neural network (CNN) trained on baggage images of the same type as said image in order to obtain, for each class in a plurality of classes of baggage and defined for the type of said image, a probability of said non-identified baggage belonging to said class.

An application of a convolutional neural network in general comprises four phases:
a convolution phase;
a so-called "pooling" phase;
a phase of applying an activation function;

a linear-combination phase, referred to as "fully connected".

The convolution phase comprises a convolution or plurality of successive convolutions by a convolution kernel. At the output of each input data convolution by the convolution kernel, a set of characteristics representing said input data is obtained. The characteristics obtained are not predefined but learned by the neural network during a training phase.

During the training phase, the convolution kernel develops so as to "learn" to extract relevant characteristics for a given problem.

The "pooling" phase is an intermediate phase between two convolutions. The purpose of each "pooling" phase is to reduce the size of the data that it receives as an input, while preserving the important characteristics of these input data. The "pooling" phase makes it possible to reduce the number of calculations in the convolutional neural network.

The phase of application of an activation function consists of applying a mathematical function, referred to as an activation function, to the data obtained at the output of each convolution. The term activation function comes from a biological equivalent activation potential, which represents a stimulation threshold which, once reached, gives rise to a response from a neurone.

The linear combination phase always constitutes the last phase of a neural network, whether or not it be convolutional. This phase receives a vector as an input, referred to as the input vector, and produces a new vector as an output, referred to as the output vector. For this purpose, it applies a linear combination to the components of the input vector. The linear combination phase makes it possible to classify the input data of the neural network according to a predefined number of classes N. It therefore returns an output vector of size N. Each component of the output vector is associated with a class and represents a probability of the input data of the neural network belonging to said class. Each component of the input vector can contribute differently to the output vector. To do this, when the linear combination is applied, a different weight is applied to each component according to an importance that it is wished to give to the characteristic that this component represents. The linear combination of the linear combination phase is generally followed by a layer of transformation of the output vector into a probability distribution. The convolutional neural network learns the values of the weights of the linear combination phase in the same way as it learns to develop the convolution kernel. It is said that the weight of the linear combination phase and the characteristics of the convolution kernel constitute the parameters of the convolutional neural network or parameters of the CNN.

As we shall describe hereinafter, the parameters of each CNN and the classes of baggage are supplied by the remote server of the airline to each check-in system and each search system.

Figure 5:
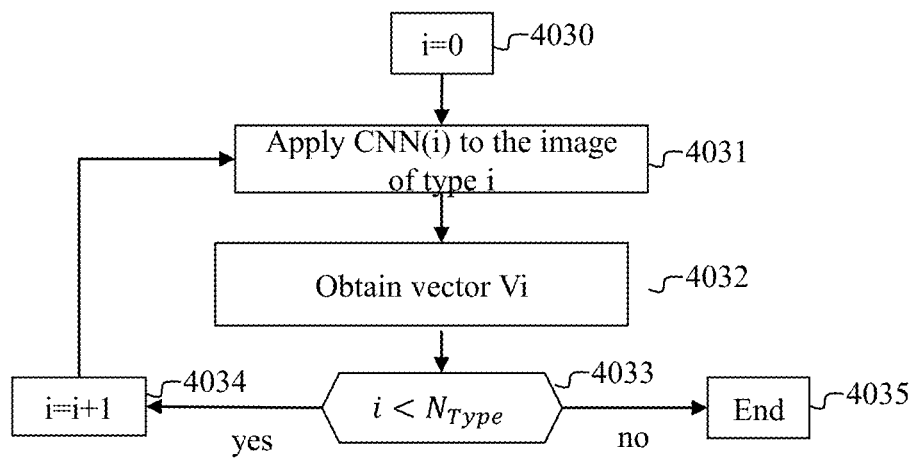
FIG. 5 illustrates schematically a detail of the method for identifying an addressee of a non-identified baggage item.

FIG. 5 details step 403.

The processing module 30 used in the steps of the method in FIG. 5 is that of the search system.

In a step 4030, the processing module 30 initialises a variable i to zero. The variable i will make it possible to run through all the image types.

In a step 4031, the processing module 30 applies the CNN trained on images of a type with the index i to the image of a type with the index i of the non-identified baggage. Hereinafter the CNN trained on images of a type with the index i is designated CNN(i). Hereinafter we describe in relation to FIG. 6B how each CNN CNN(i) is trained. In one embodiment, the processing module 30 uses a convolutional neural network described in the document "*ImageNet Classification with Deep Convolutional Neural Networks*, A. Krizhevsky, I. Sustkever, G. E. Hinton, Part of: *Advances in Neural Information Processing Systems* 25 (NIPS 2012)" when the image type corresponds to images in the visible range or IR images. In one embodiment, the processing module 30 uses a convolutional neural network described in the document "*VoxNet: A 3D Convolutional Neural Network for real-time object recognition*, Daniel Maturana; Sebastian Scherer, 2015 *IEEE/RSJ International Conference on Intelligent Robots and Systems (IROS)*" when the image type corresponds to 3D images.

In a step 4032, at the output of the application of the CNN(i) to the image of a type with the index i of the non-identified baggage, the processing module 30 obtains a vector $V_i$. The vector $V_i$ comprises j components each representing a probability of the non-identified baggage corresponding to a class of baggage class(i, j) defined for the image type of index i. We describe hereinafter an example of a method of defining classes in relation to FIG. 6A.

In a step 4033, the processing module 30 compares the variable i with the number of different types of image $N_{Type}$. If $i<N_{Type}$, the processing module 30 increments the variable i by one unit in order to pass to the following image type and returns to step 4031. Otherwise the processing module 30 ends the application of the CNNs in a step 4035 (i.e. ends the execution of step 403).

Returning to FIG. 4, in a step 404, for each image of the non-identified baggage, the processing module 30 of the search system identifies the class of baggage in the plurality of classes of baggage defined for the type of said image having the highest probability. To do this, the processing module 30 of the search system determines the component of the vector $V_i$ corresponding to the type of said image having the highest probability. At the end of step 404, the processing module 30 of the search system obtains, for each type of image, a baggage class for the non-identified baggage depicted in said image.

In a step 405, the processing module 30 applies a baggage search procedure corresponding to each class identified in the database in order to obtain at least one candidate baggage item. The baggage searched for in the database must be associated, for each image type, with the same baggage class. The probability of two items of baggage being associated with the same classes for each type of image being low, the number of candidate baggage items is small, but is at least equal to unity since the non-identified baggage item is referenced in the database.

In a step 406, the processing module 30 supplies to the operator each image stored in the database corresponding to the baggage items associated, for each image type, with the same baggage class. From these images, the operator compares the non-identified baggage item with each candidate baggage item in order to identify the addressee of the non-identified baggage. The operator can then re-label the non-identified baggage with the original label stored in the database.

In one embodiment, the search system is different from the check-in system. For example, the search system comprises fewer cameras than the check-in system, or cameras positioned at different points. In one embodiment, the search system is implemented on a roaming device, such as a smartphone or a tablet, provided with a camera. The operator then takes images of the non-identified baggage using said roaming device from a plurality of points of view. In this embodiment, each image acquired by the search system is considered to belong to each image type associated with the same nature of image. For example, an image in the visible range acquired by the search system is considered to belong to all the image types comprising images in the visible range, whatever the point of view on the baggage represented by this image. It is then possible to have as an input of step 403 a plurality of images for the same image type and therefore to obtain a plurality of vectors for the same image type. In this case, in step 404, the class of the baggage identified for this image type is the class associated with the highest probability in all the vectors associated with this image type.

In one embodiment, the method of FIG. 4 comprises a step 402, intermediate between step 400 and step 403. In this embodiment, when a baggage item is checked in, the processing module 30 of the check-in system stores in the database external information representing the baggage. The external information is for example a weight of the baggage supplied by the conveyor belt of the check-in desk 20, information representing the colour or colours of the baggage supplied by a camera in the visible range, and dimensions of the baggage supplied by a 3D camera. In step 402, the processing module 30 of the search system obtains at least some of this external information representing the baggage and uses it to prefilter the database in order, in step 405, to search only among the baggage associated with the same external information.

In another embodiment, it is known that, when an addressee of a baggage item does not recover said baggage, he informs the airline responsible for the baggage of this fact. Each item of baggage being associated with information representing its addressee in the database, as soon as a baggage item is declared lost by its addressee, the airline finds the baggage in the database and modifies the information relating to said baggage in the database in order to add thereto information indicating that the baggage has been lost. Thus, in this embodiment, which may be combined with the previous embodiment, in step 405, the processing module 30 of the search system searches only among the baggage items declared lost in the database.

In another embodiment, which may be combined with the previous two embodiments, the processing module 30 of the search system uses the timestamp information associated with each baggage item referenced in the database in order to filter the database. Thus, considering that a non-identified baggage item is discovered in general in a period of duration D following the checking in thereof, the processing module 30 of the search system, in a step 405, searches only among the baggage checked in in the database during a period D preceding the discovery of the non-identified baggage.

Figure 6A:
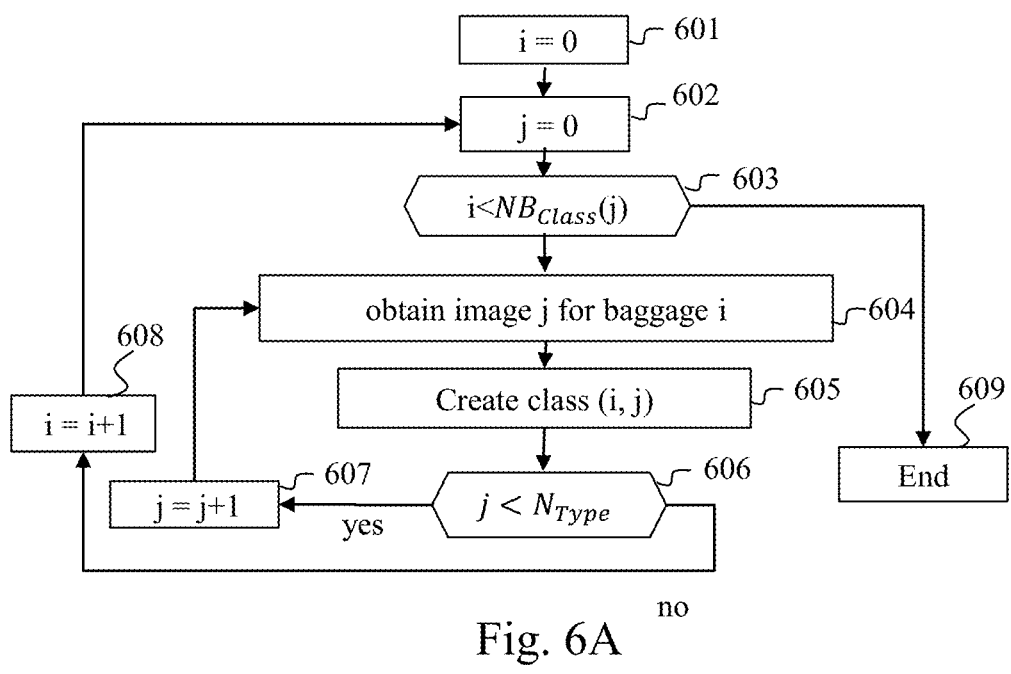
FIG. 6A illustrates schematically an example of a method for creating classes.

FIG. 6A illustrates schematically an example of a method for creating classes.

A neural network classifies input data according to classes and, as an output, for each class, provides a probability of the input data corresponding to said class. The method of FIG. 6A makes it possible to define classes automatically.

The method of FIG. 6A is executed by a processing module of the remote server. In one embodiment, the processing module of the remote server is identical to the processing module 30.

When the remote server and each check-in system is launched, no baggage is referenced in the database. No class has yet been created. The database is enhanced and the classes are created as baggage is checked in at baggage check-in desks comprising a check-in system. When the method in FIG. 6A is executed, each check-in system making an image acquisition when baggage is checked in transmits these images to the processing module of the remote server. In one embodiment, during the execution of the method in FIG. 6A, no check-in system attempts to classify an item of baggage. The initial systems merely acquire images of baggage.

In a step 601, the processing module of the remote server initialises a variable i to zero.

The variable i makes it possible to count the number of classes created.

In a step 602, the processing module of the remote server initialises a variable j to zero.

The variable j makes it possible to run through the image types.

In a step 603, the processing module of the remote server compares the variable i with a number of classes $NB_{Class}(j)$ for the image type j. At this step, the number of classes $NB_{Class}(j)$ is predefined. For example, $NB_{Class}(j)=1000$. If the variable i has reached the number of classes $NB_{Class}(j)$, the method in FIG. 6A ends in a step 609. A number of classes $NB_{Class}(j)$ has then been defined for each image type j.

Otherwise, in a step 604, the processing module of the remote server awaits reception of an image for the image type of index j from a processing module 30 of a check-in system.

When the processing module of the remote server receives an image, referred to as the current image, it creates a new class of baggage similar or identical to the baggage represented by the current image for the image type of index j in a step 605. In other words, the processing module of the server adds a new class to a list of any classes existing for the image type with the index j.

In a step 606, the processing module of the remote server compares the variable j with the number of different types $N_{Type}$. If $j<N_{Type}$, the processing module of the remote server increments a variable j by one unit and returns to step 604.

Otherwise the processing module of the remote server passes to a step 608, during which it increments a variable i by one unit and returns to step 602.

It should be noted that the method of FIG. 6A makes it possible to create $NB_{Class}(j)$ classes of baggage for each of the $N_{Type}$ different image types from the first $NB_{Class}(j)$ baggage items checked in by baggage check-in desks comprising a check-in system. It is considered here that a number $NB_{Class}(j)$ makes it possible to obtain a sufficient diversity of baggage classes representative of all the baggage items that the airline would have to check in.

Figure 6B:
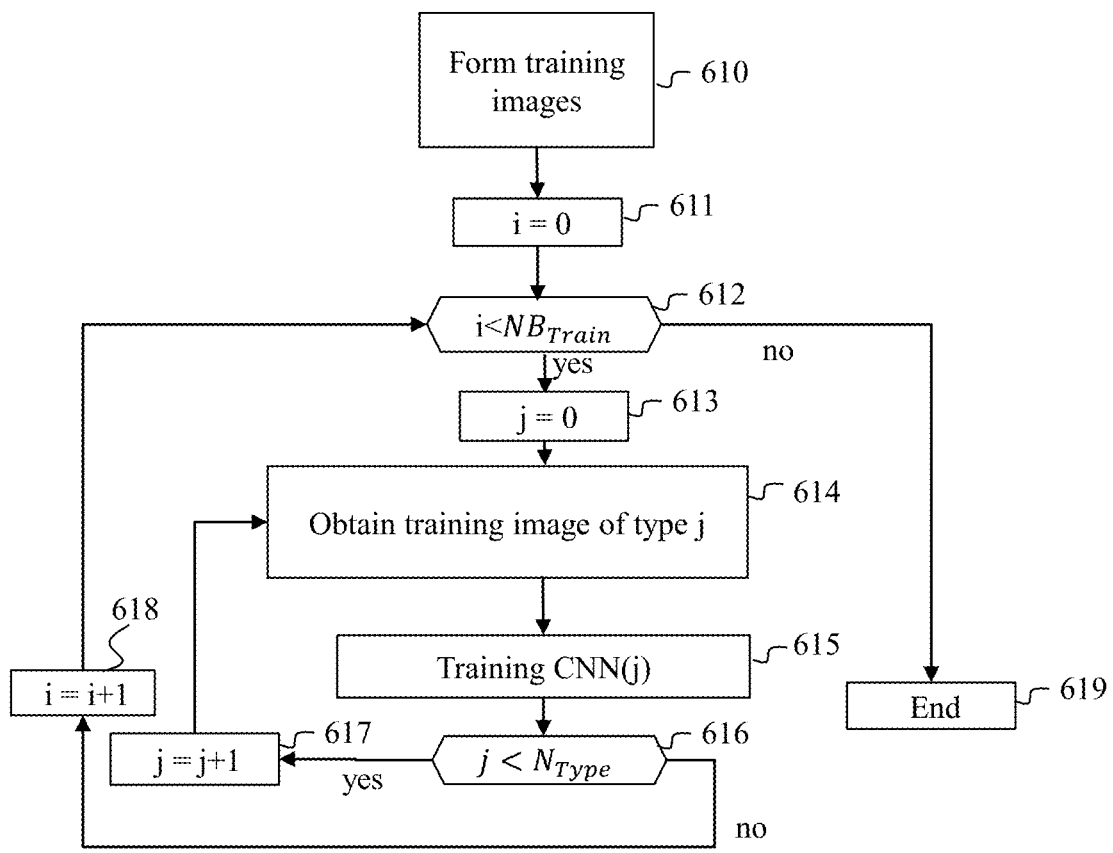
FIG. 6B illustrates schematically an example of a method for training convolutional neural networks.

FIG. 6B illustrates schematically an example of a method for training convolutional neural networks.

Like all CNNs, each CNN used in step 403 must be trained. The method in FIG. 6B is executed by the processing module of the remote server following the method in FIG. 6A. To carry out its training, each CNN must use images, referred to as training images, for which the classification according to the classes defined by the method in FIG. 6A is known.

In a step 610, for each image type, the processing module of the remote server generates training images from images that serve to define the baggage classes, hereinafter referred to as base images. To do this, for each base image, the processing module creates a predefined number $n_{train}$ of training images. Then a number of training images $NB_{Train} = n_{train} \times NB_{Class}(j)$ is obtained for each image type. In one embodiment $n_{train}=5$. For each base image in the visible range or each infrared image, each training image is for example obtained as follows:

first training image: low-pass filtering of the pixel values of the base image;

second training image: addition of a Gaussian noise to the base-image pixel values;

third training image: reduction of the resolution of the base image, for example by subsampling;

fourth training image: increasing the resolution of the base image by linear interpolation of the pixel values;

fifth training image: deletion of a band of predefined width to the left and right of the base image.

For each base image representing a 3D image, each training image is for example obtained as follows:

first training image: low-pass filtering of the depth values of the base image;

second training image: addition of a Gaussian noise to the depth values of the base image;

third training image: reducing the resolution of the base image, for example by subsampling;

fourth training image: increasing the resolution of the base image by linear interpolation of the depth values;

fifth training image: deletion of a band of predefined width to the left and right of the base image.

In one embodiment, the predefined number of training images $n_{train}$ could be different from 5. Moreover, other methods for obtaining training images could be envisaged. In a step 611, the processing module of the remote server initialises a variable i to zero. The variable i is used for counting a number of training images used.

In a step 612, the processing module of the remote server compares the variable i with the number of training images $NB_{Train}$. If $i=NB_{Train}$, the training of the neural networks ends during a step 619. Otherwise the processing module of the remote server initialises a variable j to zero in a step 613. The variable j is used to run through each type of image.

In a step 614, the processing module of the remote server obtains a training image of the type with the index j.

In a step 615, the processing module of the remote server trains a neural network CNN(j) dedicated to the images of the type with the index j using the training image. During this step, the processing module of the remote server determines (learns) the parameters of the neural network. To do this, it uses a training method described in the document "*ImageNet Classification with Deep Convolutional Neural Networks,* A. Krizhevsky, I. Sustkever, G. E. Hinton, Part of: *Advances in Neural Information Processing Systems 25* (NIPS 2012)" when the image type corresponds to images in the visible range or IR images, or in the document "*VoxNet: A 3D Convolutional Neural Network for real-time object recognition,* Daniel Maturana; Sebastian Scherer, 2015 *IEEE/RSJ International Conference on Intelligent Robots and Systems (IROS)*" when the image type corresponds to 3D images. Since each training image comes from a base image, the classification of a training image is derived from the class issuing from the original base image. It should be noted that, when step 615 is first executed, the parameters of the neural network are initialised randomly.

In a step 616, the processing module of the remote server compares the variable j with the number of different types of image $N_{Type}$. If $j<N_{Type}$, the processing module of the remote server increments the variable j by one unit in a step 617 and returns to step 614 in order to pass to the training of another neural network. Otherwise the processing module of the remote server increments the variable i by one unit in a step 618.

In step 619, a trained neural network CNN(j) is therefore obtained for each type of image with the index j among the $N_{Type}$ types of different images.

Figure 6C:
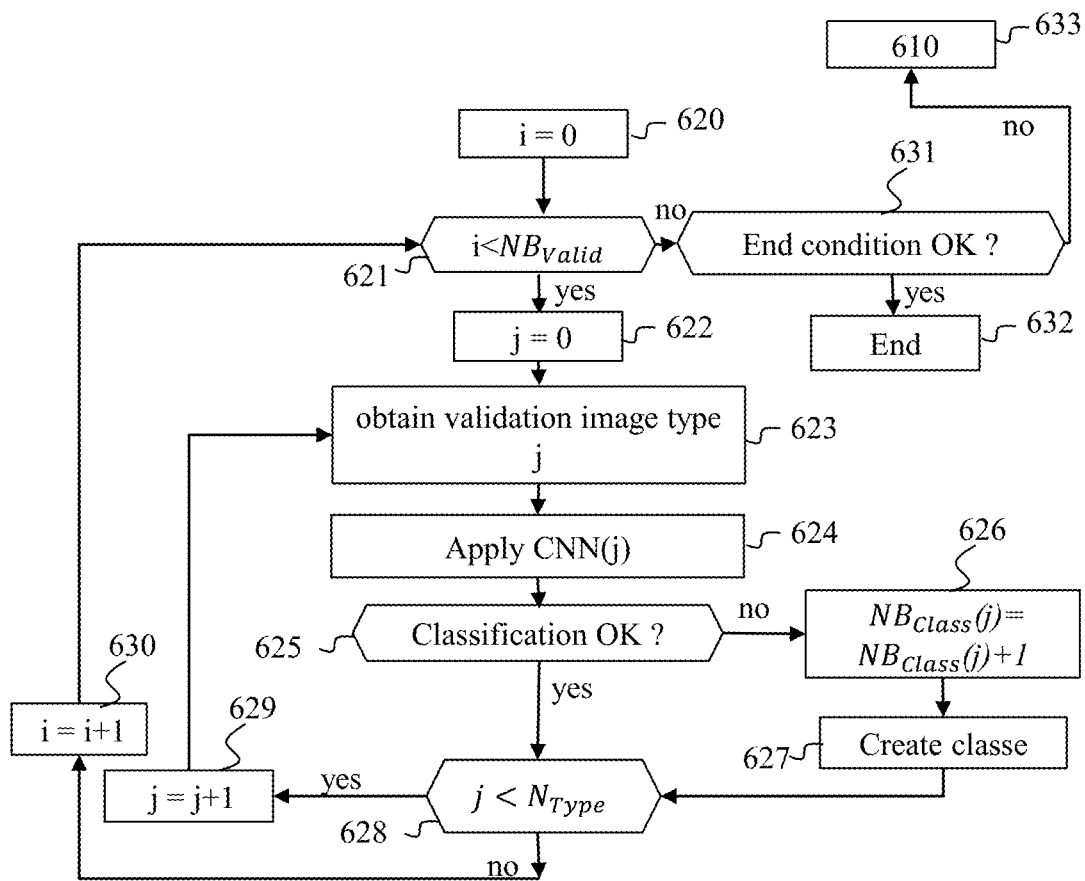
FIG. 6C illustrates schematically an example of a method for validating convolutional neural networks.

FIG. 6C illustrates schematically an example of a method for validating convolutional neural networks.

It is conventional to check that a neural network has been trained correctly. To do this, when a neural network is used for classifying images, use is made of images, referred to as validation images, that have not been used for training the neural network in order to check that the neural network is correctly classifying these validation images. In general, if a classification error rate is too high, the neural network is trained once again. In the context of the invention, the errors may also be due to a poor definition of the classes by the method of FIG. 6A. This is because it is possible that the $NB_{Class}(j)$ that were defined in the method of FIG. 6A are not representative of all the possible baggage items that an airline could receive.

In one embodiment, the method of FIG. 6C is executed optionally by the processing module of the remote server following the method of FIG. 6B. In order to execute this method, the processing module of the remote server uses images supplied by initial systems. In one embodiment, during the execution of the method of FIG. 6C, no check-in system seeks to classify baggage items.

In a step 620, the processing module of the remote server initialises the variable i to zero. The variable i is used for counting the validation images.

In a step 621, the processing module of the remote server compares the variable i with a predetermined number of validation images $NB_{Valid}$. In one embodiment, $NB_{Valid}=500$. If $i<NB_{Valid}$, the processing module of the remote server initialises a variable j to zero. The variable j serves to run through the image types.

In a step 623, the processing module of the remote server obtains a validation image of the type with the index j transmitted by a check-in system when a baggage item is checked in.

In a step 624, the processing module of the remote server applies the CNN CNN(j) to the validation image received at step 624. Following this step, the processing module of the remote server obtains a vector $V_i$ of size $NB_{Class}(j)$ in which each component represents a probability of the baggage represented by the validation image corresponding to the baggage class that corresponds to said component.

In a step 625, the processing module of the remote server determines whether the classification of the baggage represented by the validation image is acceptable. To do this, for example, the processing module of the remote server compares each component of the vector $V_i$ with a predefined probability threshold $P_{TH}$. If at least one of the components is above the predefined probability threshold $P_{TH}$, the processing module of the remote server considers that the classification is acceptable. In this case the processing module of the remote server executes a step 628 during which it compares the variable j with the number of different image types $N_{Type}$. Otherwise the processing module of the remote server increments by one unit the number of classes $NB_{Class}(j)$ for the image type with the index j in a step 626. In a step 627, the processing module of the remote server creates a new class from the validation image. Step 627 is followed by step 628. The predefined probability $P_{TH}$ is for example equal to 0.5. Thus, if the vector $V_i$ does not comprise any component representing a probability of belonging to a class higher than 0.5, the processing module of the remote server considers that there is uncertainty about the classification and that a new class must be created.

If in step 628, $j<N_{Type}$, the processing module of the remote server increments the variable j by one unit in a step 629 and returns to step 623 in order to pass to another image type. Otherwise the processing module of the remote server increments the variable i by one unit in a step 630 and returns to step 621.

If, in step 621, i has reached $NB_{Valid}$, the processing module of the remote server checks whether a condition for end of execution of the method of FIGS. 6B and 6C is fulfilled. A condition for end of execution is for example that the processing module has executed the methods of FIGS. 6B and 6C a number of times equal to a predefined number NMAX or that a total time of execution of the methods of FIGS. 6B and 6C has exceeded a predefined duration DMAX or that a number of classes created between step 620 and step 631 is less than a number NMIN. For example NMAX=10, DMAX=24 hours and NMIN=50.

If the condition for end of execution is fulfilled, the processing module of the remote server ends the method of FIG. 6 in a step 631. Otherwise the processing module of the remote server returns to step 610 and executes the method of FIG. 6B once again. It should be noted that, whenever the method of FIG. 6B is executed following step 631, the determination of the parameters of the neural networks CNN(j) starts again from the last parameters determined. The method of FIG. 6B is once again followed by the method of FIG. 6C.

The parameters of the $N_{Type}$ neural networks CNN(j), once determined by the method of FIG. 6B or by the combination of the methods of FIGS. 6B and 6C, are transmitted to the processing module 30 of each search system and each check-in system. Likewise, once defined by the method of FIG. 6A or by the combination of the methods of FIGS. 6A, 6B and 6C, information representing each class is transmitted to the processing module 30 of each search system and each check-in system. Thus a processing module 30 obtains an image of a baggage item, classifies the baggage item in the same way (i.e. the vector obtained at the output of the convolutional neural network corresponding to the type of said image is identical) whatever the check-in system or the search system comprising said processing module 30.

Figure 7:
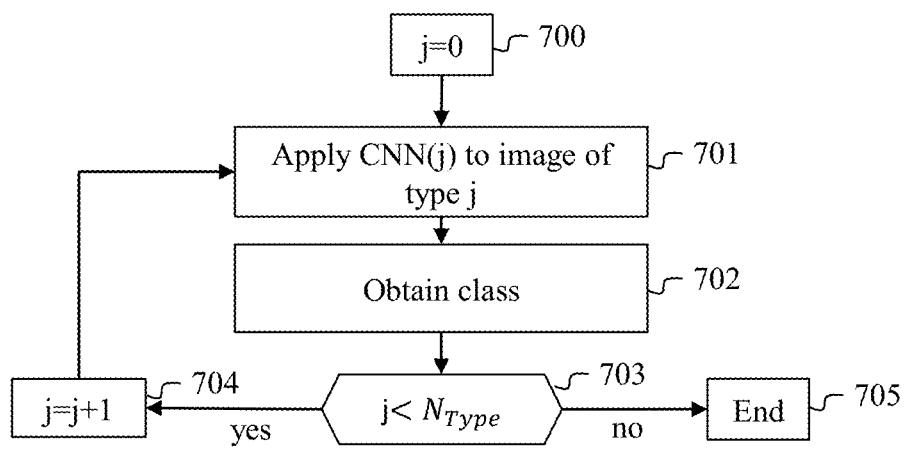
FIG. 7 illustrates schematically an example of a method for classifying baggage based on convolutional neural networks.

FIG. 7 illustrates schematically an example of a baggage classification method based on convolutional neural networks.

As seen above, each baggage item checked in by the airline company is referenced in the database of said company. In this database, each image of a baggage item acquired by a check-in system is stored in a database. In this database each image of a baggage item is associated, among other things, with classification information on the baggage item contained in said image. The method of FIG. 7 makes it possible to obtain this classification information. This method is executed by a processing module 30 of a check-in system whenever a baggage item is checked in by the airline. In one embodiment, this method is executed by a check-in system once this system has received the parameters of the $N_{Type}$ neural networks CNN(j) and the information representing each class.

In a step 700, the processing module 30 has obtained $N_{Type}$ images of the same baggage item. In step 700, the processing module 30 initialises a variable j to zero.

In a step 701, the processing module 30 applies the CNN CNN(j) to the image of type with the index j. At the output of the application of the CNN CNN(j), the processing module 30 obtains a vector $V_i$ in which each component represents a probability of the baggage item depicted in the image of type with the index j belonging to a class of baggage corresponding to said component.

In a step 702, the processing module 30 determines the component corresponding to the highest probability. In this way, the processing module 30 determines to which class the baggage depicted in said image of type with the index j belongs. Classification information on the baggage is then stored for the type with the index j.

In a step 703, the processing module 30 compares the variable j with the number of image types $N_{Type}$. If $j<N_{Type}$, the processing module 30 increments the variable j by one unit in order to pass to a new type. Otherwise the processing module 30 ends the classification of the baggage in a step 705.

The invention claimed is:

1. A method for identifying a baggage item devoid of any identifier representing an addressee of said baggage, referred to as non-identified baggage, comprising:
    obtaining at least two images of the non-identified baggage of different types, the type of image of a baggage item being dependent on a point of view on said baggage represented by said image and the nature of the data representing said baggage in said image taken from a plurality of natures of different data comprising data representing the visible range and/or data representing the infrared range and/or data representing three-dimensional information;
    for each image of the non-identified baggage obtained:
        applying said image to a convolutional neural network trained on baggage images of the same type as said image in order to obtain, for each class in a plurality of baggage classes defined for the type of image, a probability of said non-identified baggage belonging to said class; and
        identifying the baggage classes having the highest probability;
    applying a baggage search procedure comprising: searching for baggage corresponding to each class identified in a baggage database in order to obtain at least one candidate baggage item, each baggage item in said database being associated with an identifier representing an addressee of the baggage; and
    comparing the non-identified baggage with each candidate baggage item in order to identify the addressee of said non-identified baggage.

2. The method according to claim 1, wherein the method further comprises: obtaining at least one item of information representing the non-identified baggage among a weight, a colour and at least one dimension, the baggage search procedure further comprising seeking in the database baggage corresponding to each item of information representing said non-identified baggage.

3. The method according to claim 1, wherein each baggage item referenced in the database is associated with timestamping information representing a time of checking in of said baggage, the baggage search procedure further comprising seeking in the database baggage associated with timestamping information corresponding to a period determined from a time of discovery of the non-identified baggage.

4. The method according to claim 1, wherein each baggage item referenced in the database is associated with a number of items of classification information equal to a number of types of image considered at the time of each classification of a baggage item in the database, each type of image used for the non-identified baggage corresponding to at least one type of image considered at the time of each classification of a baggage item in the database, each item of classification information corresponding to a type of image and representing a class in a plurality of classes associated with said type in which the baggage was classified.

5. A device for identifying a baggage item devoid of any identifier representing an addressee of said baggage, referred to as non-identified baggage; comprising at least one processor configured to:
  obtain at least two images of the non-identified baggage, of different types, the type of image of a baggage item being dependent on a point of view on said baggage represented by said image and the nature of the data representing said baggage in said image taken from a plurality of natures of different data comprising data representing the visible range and/or data representing the infrared range and/or data representing three-dimensional information;
for each image of the non-identified baggage obtained:
apply said image to a convolutional neural network trained on images of baggage of the same type as said image in order to obtain, for each class in a plurality of classes of baggage defined for the type of image, a probability of said non-identified baggage belonging to said class; and
  identify the class of baggage having the highest probability;
apply a baggage search procedure comprising: searching for baggage corresponding to each class identified in a baggage database in order to obtain at least one candidate item of baggage; each item of baggage in said database being associated with an identifier representing an addressee of the baggage; and
compare the non-identified baggage with each candidate item of baggage in order to identify the addressee of the non-identified baggage.

6. A non-transitory storage medium storing a computer program comprising instructions for the implementation, by a device, of the method according to claim 1, when said program is executed by a processor of said device.

* * * * *